Figure 1:
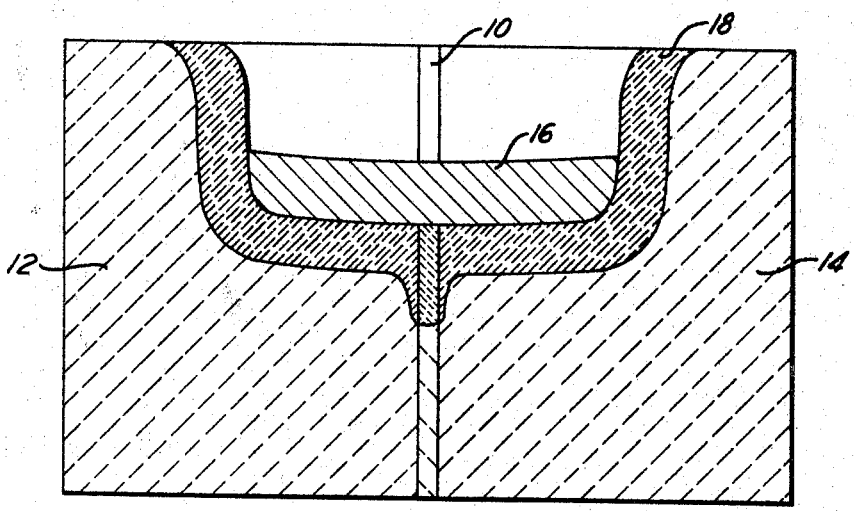

3,179,526
REFRACTORY BONDING MORTAR
James L. Dolph, Pittsburgh, Pa., assignor to Harbison-Walker Refractories Company, Pittsburgh, Pa., a corporation of Pennsylvania
Filed Mar. 5, 1962, Ser. No. 177,305
6 Claims. (Cl. 106—57)

This invention relates to refractory mortars, specifically to refractory mortars which are suitable for use in contact with molten aluminum.

In recent years, considerable experimentation and research has been conducted to improve the quality of refractory brick for use in aluminum melting and holding furnaces. Higher melting rates and the development of new aluminum alloys, particularly those containing magnesium and silicon, demonstrated the need for bodies which would better resist the corrosion and erosion of the molten metals in those furnaces. One advance in this field which has enjoyed considerable commercial success was the discovery that additions of alkaline earth oxides to high alumina brick produce shapes exhibiting exceptionally good resistance to molten aluminum and its alloys. This development is described in my copending application, Serial Number 67,955, now U.S. Patent 3,078,173.

With the manufacture of improved refractory brick, it became apparent a more chemically resistant mortar was required. Examination of aluminum melting furnaces after a shutdown due to refractory failure showed that the mortar joints were contributing very largely to these failures. The molten aluminum apparently had reacted with the mortar causing it to become weak at the operating temperatures and the metal would run down into the joints, thereby allowing the metal to attack the brick from all sides instead of from the operating face only. A considerable quantity of molten metal was lost in this manner and the brick were disintegrated with distressing rapidity. Also, the aluminum sometimes formed wedges in the sidewall joints which caused the wall to bow in and in some exceptionally severe cases to collapse.

Structures laid up of refractory brick consist of many relatively small units. The strength of these structures depends upon the strength of the individual elements, the manner in which they are laid up, and the character of the mortar material placed in the joints. The purpose of the mortar is to fill the joints and to bond the units together. The mortar should also protect the joints from attack by slag and act to prevent infiltration of cold air and the outward passage of gases, slags and metal.

The requirements which a bonding mortar must meet in service are frequently extremely exacting and demand a carefully adjusted balance of properties. For economy and convenience in laying, a mortar should have good working properties when mixed to either putty-like or cream-like consistency. With excellent workability and water retention over a range of consistencies, a mortar can be used for dipped or troweled joints. The mortar should not shrink excessively upon drying or heating and should have a good working time and provide both cold and hot bonding strengths. The thermal expansion of the mortar should be substantially the same as that of the brick or temperature variations will affect the bond between brick ond mortar causing the surface coatings to crack and peel. The refractoriness must be high enough that the mortar will not melt or flow from joints at furnace operating conditions. In addition, the aluminum furnace service greatly accentuates the need for a mortar chemically resistant to attack, especially from fluxes and gases that may be present during use.

Rerfactory mortar materials can be divided into two general classes: heat-setting bonding mortars and air-setting bonding mortars. The distinguishing feature of a heat-setting bonding mortar is that it develops a strong bond only at furnace temperatures and has only moderate strength at lower temperatures. The bonding temperature generally lies between 2000° F. and 2500° F., depending upon its composition. For many purposes, heat-setting bonding mortars do not meet the needs of modern furnace practice. At moderate temperatures, a heat-setting bonding mortar acts merely as a filler between the brick although the flexibility of such a structure is sometimes valued. Not until a temperature of 2000° F. or higher is reached do the average heat-setting bonding mortars develop sufficient strength to bond the brickwork firmly together.

Air-setting mortars take a rigid cold set (normally after drying out), having a firm bond at all temperatures, and form mechanically strong joints with high resistance to abrasion and erosion. Bonding mortars of the air-setting type are now used for laying all types of standard refractory brick, especially in those portions of a furnace where the operating conditions are most severe. Air-setting mortars are recommended for service in which a strong bond is desired over a wide range of temperatures. Chemical binders are used to impart air-setting properties and to maintain the strength of the bond up to the temperature at which the ceramic bond takes effect.

The most common air-setting mortars are bonded with sodium silicate. These mortars are strong and exhibit excellent workability. However, it has been found that the sodium silicate bond reacts extremely rapidly with molten aluminum, resulting in deep joint penetration. Commercial experience showed this to be greater than attack through the refractory brick joined by the mortar. Similar experience was had with other known mortars. The types of mortars tested and found to be inadequate in the manner just stated probably account for at least 95 percent of all commercial refractory mortars containing cold setting agents.

It is therefore the primary object of this invention to provide new mortars of the air-setting type.

A further object of the invention is to provide new air-setting mortars particularly suited for use in aluminum melting furnaces and which are readily prepared from commercially available materials.

Another object of the invention is to provide furnaces and linings therefor of particular utility for aluminum melting practices.

Figure 2:
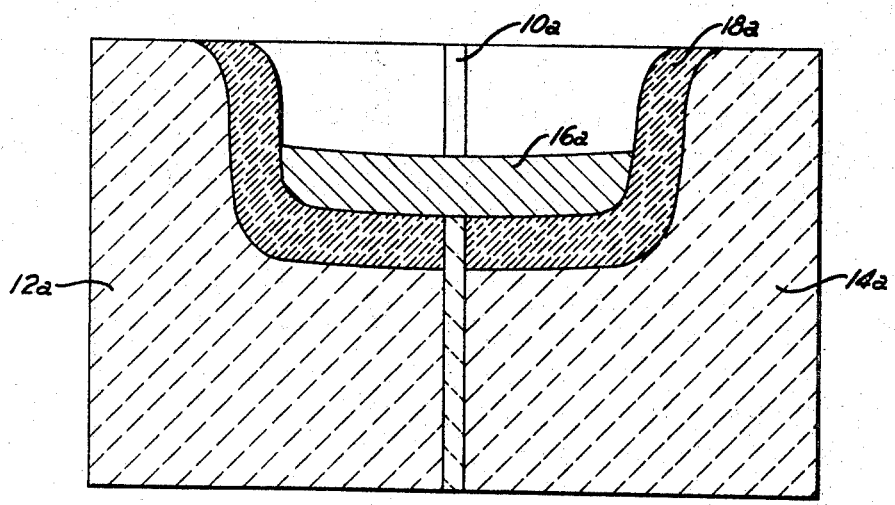

In the attached drawing,

FIG. 1 is a schematic view in section showing the results of molten aluminum attack on a lining including a conventional mortar; and FIG. 2 is a schematic view in section showing the results of molten aluminum attack on a lining including the novel mortar of this invention.

In accordance with the present discoveries, there are provided novel mortar compositions consisting essentially, by weight, of 15 to 25 percent of orthophosphoric acid of 75 percent concentration, or the equivalent thereof as hereinafter defined, and the remainder at least one member selected from the group consisting of high alumina materials and zircon. Upon the addition of tempering fluids, if needed, and application by use in lining construction, the resulting lining exhibits longer life and less wear because of the outstanding resistance of the mortars. Mortar according to the instant invention is no longer a weak point in the lining as would permit penetration of materials being treated. Other desirable properties of mortar according to the present discoveries are substantial elimination of shrinkage and resulting cracks, elimination of vitrification at working temperatures, and good strength and working time.

The mortar batches of the invention contain 15 to 25 weight percent of orthophosphoric acid of 75 percent concentration, or an equivalent amount, expressed as $P_2O_5$, of acid of other concentration, or of a phosphate compound providing $P_2O_5$. It is to be noted that the phosphoric acid content of these mortars far exceeds the quantity that would be needed for bonding purposes alone. The excess acid functions in some unknown manner to inhibit attack on the mortar composition, and no conclusive theory to explain this action has been formulated to date.

The other major constituent of the mortar compositions of the invention is a high alumina material or zircon. Zircon is derived from beach sands and is a well-known article of commerce. Generally, zircon averages over 95 percent by weight of $ZrO_2$ plus $SiO_2$ and the remainder is composed of alumina, titania, iron oxide, calcium oxide, magnesium oxide or the like. Representative high alumina materials, and which may be used calcined or uncalcined, include bauxite, alumina, calcined diaspore, or minerals of the kyanite-sillimanite group. Alumina materials for purposes of this invention have an analysis of at least 50 weight percent $Al_2O_3$ and preferably at least 60 percent thereof. The analyses of preferred materials used in the invention are, in weight percent, as follows:

|  | Calcined Bauxite, Percent | Calcined Alumina, Percent | Crude Clay, Percent | Zircon, Percent |
| --- | --- | --- | --- | --- |
| $SiO_2$ | 6.2 | 0.03 | 65.4 | 32.3 |
| $Al_2O_3$ | 89.0 | 99.5 | 20.8 | 1.0 |
| $TiO_2$ | 3.1 | 0.03 | 1.2 | 0.2 |
| $Fe_2O_3$ | 1.5 | 0.2 | 2.6 | 0.2 |
| CaO |  | 0.08 | 0.1 | 0.16 |
| MgO |  | 0.03 | 0.6 | 0.04 |
| Alkalies | 0.2 | Trace | 2.3 |  |
| Ignition Loss |  |  | 7.0 |  |
| $ZrO_2$ |  |  |  | 66.1 |

Mortar according to the concepts of this invention has utility with various available refractory shapes utilized in the lining of furnaces. An example of refractory shapes with which mortar according to this invention might be used are those provided as taught in my copending application Serial Number 67,955, filed November 8, 1960. Other typical refractory shapes with which these mortars might be used are of materials such as zircon, chrome, fire clay, high alumina materials generally, and the like.

For purposes of explanation, and not by way of limitation, consideration of the refractory shapes of the above-identified application is contained herein. Those refractory shapes are non-vitrified and contain about 1 to 30 percent of an alkaline earth oxide and the remainder being substantially all material selected from the group consisting of alumina and aluminum ores containing from about 50 and preferably at least 70 percent of $Al_2O_3$. The alumina content can be provided by using various of the materials disclosed in my copending application containing the requisite high $Al_2O_3$.

Shapes are formed by mixing the appropriate grind, adding the requisite tempering fluid, and pressing or otherwise forming the desired shape. The resulting shapes are generally dried and fired under controlled conditions to produce the desired product. The foregoing refractory shapes are quite satisfactory in aluminum furnaces wherein the instant mortar compositions are particularly successful.

The mortar batch is prepared in accordance with the practices now standard in the industry. The refractory constituents are ground to a size such that essentially all will pass a 28 mesh Tyler screen. Still finer grinding improves the smoothness of spreading. For further smoothness of spreading, a few percent of crude bentonite, crude fire clay or the like can be included in the batch. The acid and refractory batch constituents, along with water to provide the desired consistency, are well mixed and then applied in the conventional manner.

The invention will be described further in conjunction with the following examples in which the details are given by way of illustration and not by way of limitation.

Each of the following batches was prepared by mixing the refractory constituents, acid and water in a commercial type mixer. The analyses of the materials used are those given in the table above. Batch A was prepared from 3 parts of clay and 97 parts of −28 mesh calcined bauxite. Then 18 percent, based on the batch solids, of 75 percent phosphoric acid was added along with 9.7 weight percent of water. In batch B, the refractory constituents were 7 parts of crude bauxite for each 93 parts of −28 mesh calcined bauxite. To these solids were added 24 parts of the 75 percent phosphoric acid, 2 parts of the clay as a plasticizer and 5 parts of water, all based on the bauxite solids. In batch C, 18 percent of the 75 percent phosphoric acid, 2 percent of the clay plasticizer and 10 percent of water was included in a refractory batch composed of 3 parts of crude bauxite for each 97 parts of −28 mesh calcined alumina. Batch D was made using 3 parts of crude bauxite for each 97 parts of −65 mesh zircon sand. Then 15 percent of the phosphoric acid, 3 percent of the clay plasticizer and 4.4 percent of water, all based on the zircon and bauxite, were added. The crude bauxite mentioned for each of these batches had the same proportional composition as the calcined bauxite in the table of analyses given above but it contained 27 percent chemically combined water as is typical of bauxite.

After mixing, each of these mortars was used by laying up refractory brick prepared, in accordance with the teachings in my copending application, Serial Number 67,955, above identified. The resulting mortar and brick lining were then subjected to molten aluminum. All of the refractory mortar batches exhibited exceptional resistance to attack and penetration. Storage life was also excellent and no heat was required after installation to maintain the strength in the joints. It was further noted that the mortar workability was satisfactory, and that in use no deleterious shrinkage or vitrification occurred.

In order to determine and demonstrate the resistance of mortars to chemical attack, a special testing method was developed and is as follows: A pocket is cut into a 9 x 4½ inch face of a refractory brick, 9 x 4½ x 2½ inches. The brick is then cut through the center of the pocket parallel to the 9 x 2½ inch face and rejoined by the mortar to be tested. The thickness of the joint is approximately ⅛ inch. The test sample is brought to 2000° F. in a furance and held for five hours. The temperature is then dropped to the testing temperature, held for one hour, and approximately 0.6 pound of molten aluminum metal is poured into the pocket. Once during the first one-half hour after charging the bottom of the cup is scraped with a heat resistant hoe. The test specimen is held at temperature for 30 hours after the charging of the metal. The sample is then cooled and cut through the center of the pocket which is parallel to the 2½ x 4½ inch face so the penetration and reaction of the metal with the mortar can be examined.

FIGURES 1 and 2 show schematically the results of molten aluminum penetration and chemical attack on mortared refractory bricks where the only difference between the two systems is the type mortar used. The bricks utilized in this test were 90 percent alumina brick commercially available before the brick of my copending application. Referring to FIG. 1, 10 indicates the mortar joining two bricks 12 and 14. Some molten aluminum 16 is shown in the pocket cut into the brick. The attacked portion of the brick is shown in the lined area 18. Referring to FIG. 2, the mortared joint is indicated as 10a joining bricks 12a and 14a. The molten aluminum in the pocket is indicated as 16a and the attacked and penetrated area as 18a. It is to be noted that the actual test samples from which these figures were made utilized brick of identical composition. Those for FIG. 1 were bonded with a mortar having a sodium silicate bonding agent whereas the brick for FIG. 2 were bonded with the phosphoric acid mortar of the present invention.

Comparing the two figures, it is noted that the chemical attack and penetration is similar in both figures with respect to the brick. The contrasting results, however, are indicated at the mortar. In FIG. 1, it will be observed that metal penetration and attack has extended beyond the normal depth of attack, along the mortar joint, thereby showing that the mortar was less resistant than the brick to the molten aluminum. In FIG. 2, it will be seen that the mortared joint was even more resistant to the attack than were the brick. In actual operating conditions, this state of advantage of the present invention over prior practices is even greater for the condition shown is aggravated by the longer exposure, which in service leads to furnace failures.

Throughout the foregoing discussion, the material described was suitable for storing with a wet acid. An alternate aggregate which might be used is chrome ore, but in such a case, a dry source of $P_2O_5$ should be used. Preferably, this would be monosodium phosphate (anhydous). A preferred mix is, by weight, 95 parts chrome ore, 2 parts crude clay, 3 parts crude bauxite and 16 parts of the monosodium phosphate.

From the foregoing discussion and data, it is evident that the present invention provides a significant advance in mortars of particular utility for purposes of providing linings in furnaces for melting aluminum and its alloys. The weak point in the linings heretofore has been the susceptibility of the mortar to penetration and attack. With the mortars of the present invention, the lining can last as long as the brick, because the mortars are more resistant to molten aluminum than are the brick.

In accordance with the provision of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A wet mortar for use in joining refractory shapes consisting essentially of 18 to 20 percent, based on the weight of solids in the remainder, of 75 percent phosphoric acid and the remainder substantially all a member selected from the group consisting of high alumina materials and zircon, free of vitrifiable material, said acid being a wet acid.

2. A particulate wet mortar mixture consisting essentially of 15 to 25 percent, based on the weight of solids in the remainder of the mixture, of orthophosphoric acid, and at least one member selected from the group consisting of high alumina materials ground to pass a 28 mesh screen and zircon sand, both the high alumina materials and the zircon sand being free of vertifiable materials, said acid being a wet acid.

3. The particulate mortar mixture of claim 2 consisting essentially of the phosphoric acid and calcined bauxite.

4. The particulate mortar mixture of claim 3 consisting essentially of the phosphoric acid and zircon sand.

5. A particulate wet mortar mixture consisting essentially, of 15 to 25 percent, based on the weight of solids in the remainder of the mixture, of 75 percent phosphoric acid and the remainder substantially all a member selected from the group consisting of high alumina materials ground to pass a 28 mesh screen, and zircon sand, both the high alumina materials and the zircon sand being free of vertifiable components, said acid being a wet acid.

6. The mortar of claim 5 in which the phosphoric acid content is in the range of about 18 to 20 percent.

References Cited by the Examiner

UNITED STATES PATENTS

| | | | |
|---|---|---|---|
| 2,040,215 | 5/36 | Rava | 106—57 X |
| 2,061,099 | 11/36 | Morgan et al. | 160—57 |
| 2,220,411 | 11/40 | Kinzie et al. | |
| 2,303,304 | 11/42 | Schleicher et al. | |
| 2,702,425 | 2/55 | Thompson. | |
| 2,852,401 | 9/58 | Hansen et al. | 106—65 X |
| 2,937,101 | 5/60 | Nelson et al. | |
| 2,966,421 | 12/60 | Zimmerman et al. | 106—55 X |
| 3,078,173 | 2/63 | Dolph | 106—62 |
| 3,093,570 | 6/63 | Dewey | 266—43 X |

MORRIS O. WOLK, *Primary Examiner.*

JAMES H. TAYMAN, JR., *Examiner.*